Feb. 4, 1969  S. M. ELLIS  3,425,286
CONVERSION OF ANGULAR MOVEMENTS
Filed Jan. 26, 1967

Stafford Malcolm Ellis,
Inventor
By Wenderoth, Lind and Ponack
Attorneys

United States Patent Office 3,425,286
Patented Feb. 4, 1969

3,425,286
CONVERSION OF ANGULAR MOVEMENTS
Stafford Malcolm Ellis, Shorne near Gravesend, Kent, England, assignor to Elliott Brothers (London) Limited, London, England
Filed Jan. 26, 1967, Ser. No. 611,964
Claims priority, application Great Britain, Feb. 5, 1966, 5,162/66
U.S. Cl. 74—63          9 Claims
Int. Cl. F16h 21/42, 53/00

ABSTRACT OF THE DISCLOSURE

An apparatus capable of producing a predetermined rotational output, through a part of a revolution, of an output shaft in response to a predetermined rotational input through a part of a revolution of an input shaft. A series of members are linked between a first member rigidly mounted on the input shaft and a fourth member rigidly mounted on the output shaft. One of the members has an end which cooperates with a camming surface, and has the other end pivotally connected to a lever which is in direct abutting engagement with the member rigidly connected to the output shaft. Rotation of the input shaft causes rotation of the output shaft in a proportion depending upon the shape of the camming surface.

---

The invention relates to apparatus for converting angular movement of a first shaft into a proportionate different angular movement of a second shaft and to air data systems for aircraft including such apparatus.

According to one aspect of the invention there is provided apparatus capable of producing a predetermined rotational output, through a part of a revolution, of an output shaft in response to a predetermined rotational input, through a part of a revolution, of an input shaft, comprising a first member rigidly mounted on the input shaft; a second member pivoted to the first member at a point remote from the input shaft axis; a third member pivoted to the second member a point remote from the pivot axis with the first member and between the ends of the third member; a camming surface with which one end of the third member co-operates; a lever mounted to rotate about the axis of the input shaft and pivoted to the other end of the third member; a fourth member rigidly mounted on the output shaft and co-operating with the lever; and means for resiliently biassing the four members and the lever to predetermined operative positions; the whole arrangement being such that rotation of the input shaft causes rotation of the output shaft in a proportion depending on the shape of the camming surface.

Preferably the camming surface is substantially an arc of a circle concentric with the input shaft and is conveniently constituted by a surface of a deformable strip of material, means being provided to deform the strip at discrete areas to achieve a desired camming profile. The means for deforming the strip may comprise screw members co-operating therewith at discrete places along its length.

Preferably the point of co-operation of the lever with the fourth member is adjustable to vary the relation between the distance from said point to the input shaft axis and the distance from said point to the output shaft axis.

Preferably the output shaft axis lies substantially on the same circle concentric with the input shaft as the point of co-operation of the lever with the fourth member. With this arrangement the rotational movement of the output shaft is substantially equal to half the rotational movement of the input shaft.

The means for resiliently biassing the four members and the lever may comprise a spring co-operating with the first and fourth members to exert counter-acting moments on said first and fourth members with respect to the input shaft axis, thereby maintaining the third member in contact with the camming surface and the lever in contact with the fourth member. The spring is preferably a tension spring acting to draw together the fourth member and a part of the first member on the side of the input shaft axis remote from the second member.

The input shaft may be utilised as an output shaft, the output shaft then being utilised as an input shaft.

The apparatus may be included in an air data system having a servo arrangement, the apparatus being included in series in the servo chain, adjustment of the camming surface and/or the point of co-operation of the lever with the fourth member being effective to control the transfer function thereof as desired. The servo arrangement may include a pitot static pressure capsule, differential means for giving an output error signal on movement of the capsule output, and compensating for driving the differential means to reduce the error signal to zero, the compensating means including said apparatus, the output shaft of which is coupled to drive the differential means and the input shaft of which is driven by driving means in response to the error signal.

According to a further aspect of the invention an air data system includes an apparatus capable of providing calibration of a servo arrangement in the system, said apparatus including an input member rigidly mounted for rotation with an input shaft and an output member rigidly mounted for rotation with an output shaft, said input and output members being operatively connected by means capable of being adjusted such that angular movement of the input member is arranged to cause an adjustable proportionate movement of the output member.

The foregoing and further features of the invention will become apparent from the following description of two preferred embodiments thereof with reference to the accompanying drawings, in which.

Figure 1:
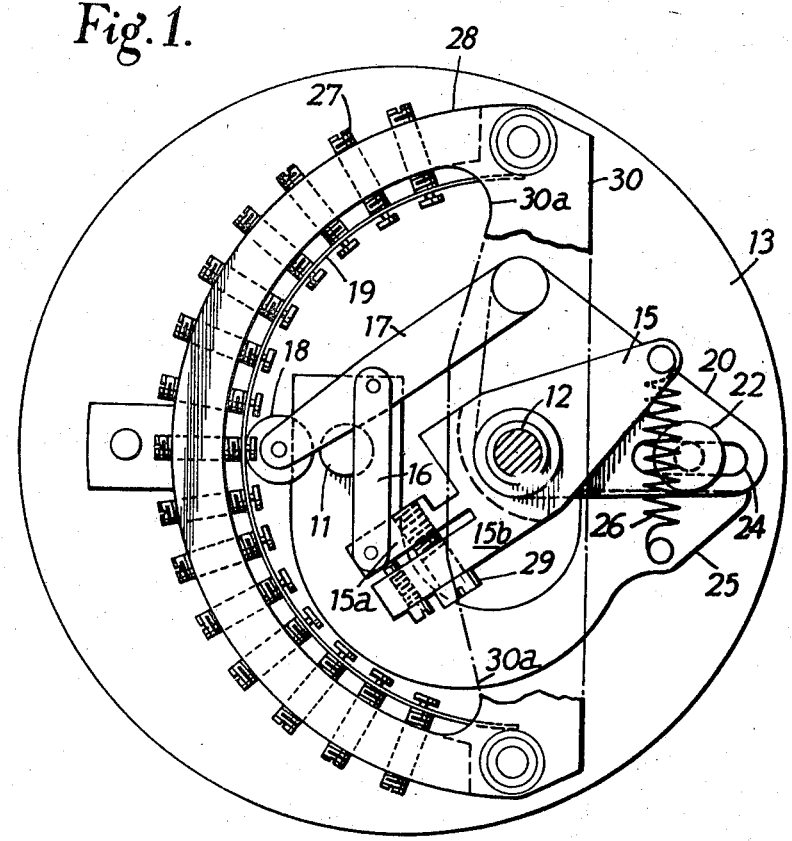
FIGURE 1 is a plan view of an apparatus according to the invention for converting angular movement of an input shaft into a proportionate different angular movement of an output shaft.
Figure 2:
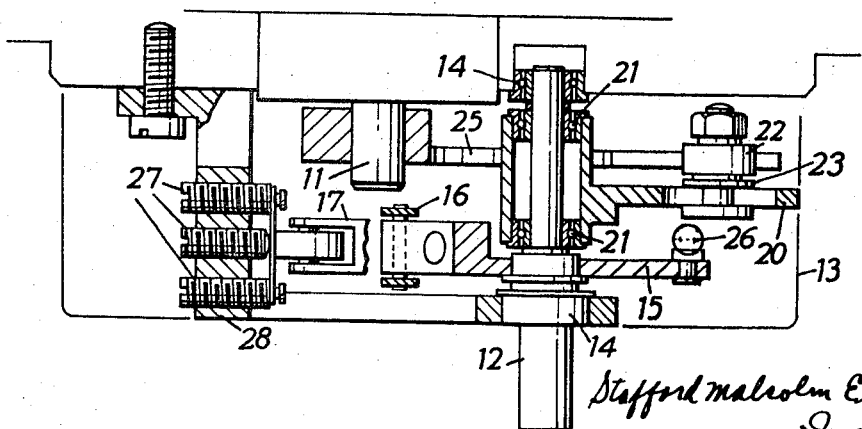
FIGURE 2 is a side elevational view, part shown sectioned, of the apparatus of FIGURE 1.
Figure 3:
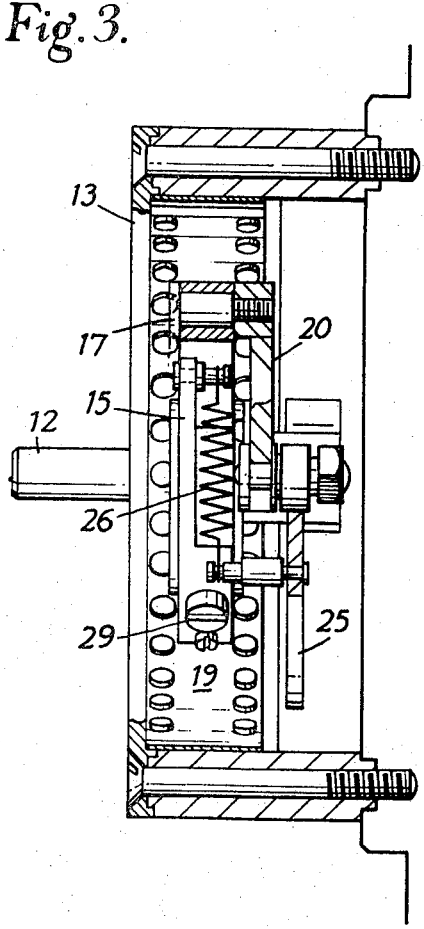
FIGURE 3 is an end elevational view, part shown in section, of the apparatus of FIGURE 1.

Referring first to FIGURES 1, 2 and 3 there is shown an apparatus capable of selectively producing a predetermined rotational output, through a part of a revolution of an output shaft 11 in response to a predetermined rotational input, through a part of a revolution, of an input shaft 12. The input shaft 12 is rotatably mounted in a housing 13 by means of ball races 14.

A first member 15 is rigidly mounted on the input shaft 12 for movement therewith. A second member 16 is hingedly mounted at one end to one end of the first member 15. The other end of the second member 16 is hingedly mounted to an intermediate point of a third member 17. One end of the third member 17 carries a roller 18 which co-operates with a camming surface 19. The other end of the third member 17 is hingedly mounted to one arm of a lever 20 referred to hereinafter as a bell crank lever and shown in the form of a triangular member. The bell crank lever 20 is mounted on the input shaft 12 by ball races 21 so as to be capable of rotational movement relative to the input shaft 12. The other arm of the bell crank lever 20 carries a roller 22. The roller 22 is fixed to the bell crank lever 20 by a mounting arrangement 23 the position of which can be varied along the slot 24 formed in the bell crank lever 20, in which the arrangement 23 is located. The roller 22 co-operates with the end surface of a fourth member 25 which is of arcuate form and which is rigidly mounted on the output shaft 11 for movement therewith.

The whole assembly is held in an operative position by a spring 26 which is mounted between the fourth member 25 and the first member 15, at its end remote from the connection to second member 16, so as to tend to bias the two mounting points of the spring towards each other.

The camming surface 19 comprises a metal strip of arcuate form which is held in position by a number of grub screws 27 which allow accurate positioning of the camming surface strip 19 in discrete areas adjacent the respective screws. The screws 27 are carried in an arcuate mounting member 28 which is carried in housing 13.

The connection between the first member 15 and the second member 16 is manually adjustable. This is achieved by the first member 15 being sloted and the portion 15a of the first member 15 to which the second member 16 is hingedly connected being movable towards and away from the portion 15b on the other side of the slot under control of a grub screw 28 and a locking screw 29.

In the position shown in the drawing the distance between, the axis of rotation of the output shaft 11 and the point of contact between the roller 22 with the fourth member 25 is approximately equal to twice the distance between the axis of rotation of the input shaft 12 and the point of contact between the roller 22 with the fourth member 25. That is to say, the axis of the output shaft 11 and the point of contact between the roller 22 and the fourth member lies on a circle the center of which is on the axis of the input shaft 12.

The arrangement as shown in FIGURE 1 is in its midway position, the first member 15 being movable through an angle of 60° in either direction about the axis of rotation of input shaft 12 and the fourth member 25 being movable through an angle of 30° in either direction about the axis of rotation of the output shaft 11. These movements are limited at the extreme positions by the roller 18 abutting portions 30a of a stop member 30 and the relative amounts of movement of the two members are controlled by their relative positions described in the next preceding paragraph.

In operation, rotation of input shaft 12 through a given angle causes the first member 15 to be rotated through the same angle and, the camming surface 19 being in the form of a semicircle having its center at the axis of rotation of input shaft 12, causes the output shaft 11 to be rotated through an angle equal to half the given angle via the linkage of the second member 16, the third member 17, the bell crank lever 20 and the fourth member 25. If it is required to cause the output shaft 11 to rotate through an angle which is slightly less than half the angle through which the input shaft 12 is rotated then the roller 22 is moved towards the axis of rotation of the input shaft 12. Alternatively if it is required to cause the output shaft 11 to rotate through an angle which is slightly more than half the angle through which the input shaft 12 is caused to rotate the roller 22 is moved away from the axis of rotation of the input shaft 12. These relative movements of the roller 22 from its midway position as shown in the drawings is achieved by unclamping the mounting arrangement 23 sliding it in the slot 24 and reclamping.

The adjustments referred to in the preceding paragraph provide a relative adjustment between the angles through which the two shafts are caused to rotate over the complete range of movement of the apparatus. If an adjustment is required over a portion of the range of movement of the apparatus the relevant screw or screws 27 are adjusted to move the camming surface 19 on either side of its midway position. The movement of the camming surface 19 from its semi-circular form causes, via the co-operating roller 18 on the third member 17, the positional relationship between the first member 15, second member 16, third member 17 and bell crank lever 20 to be changed, thus changing the amount of movement of the fourth member 25.

Figure 4:
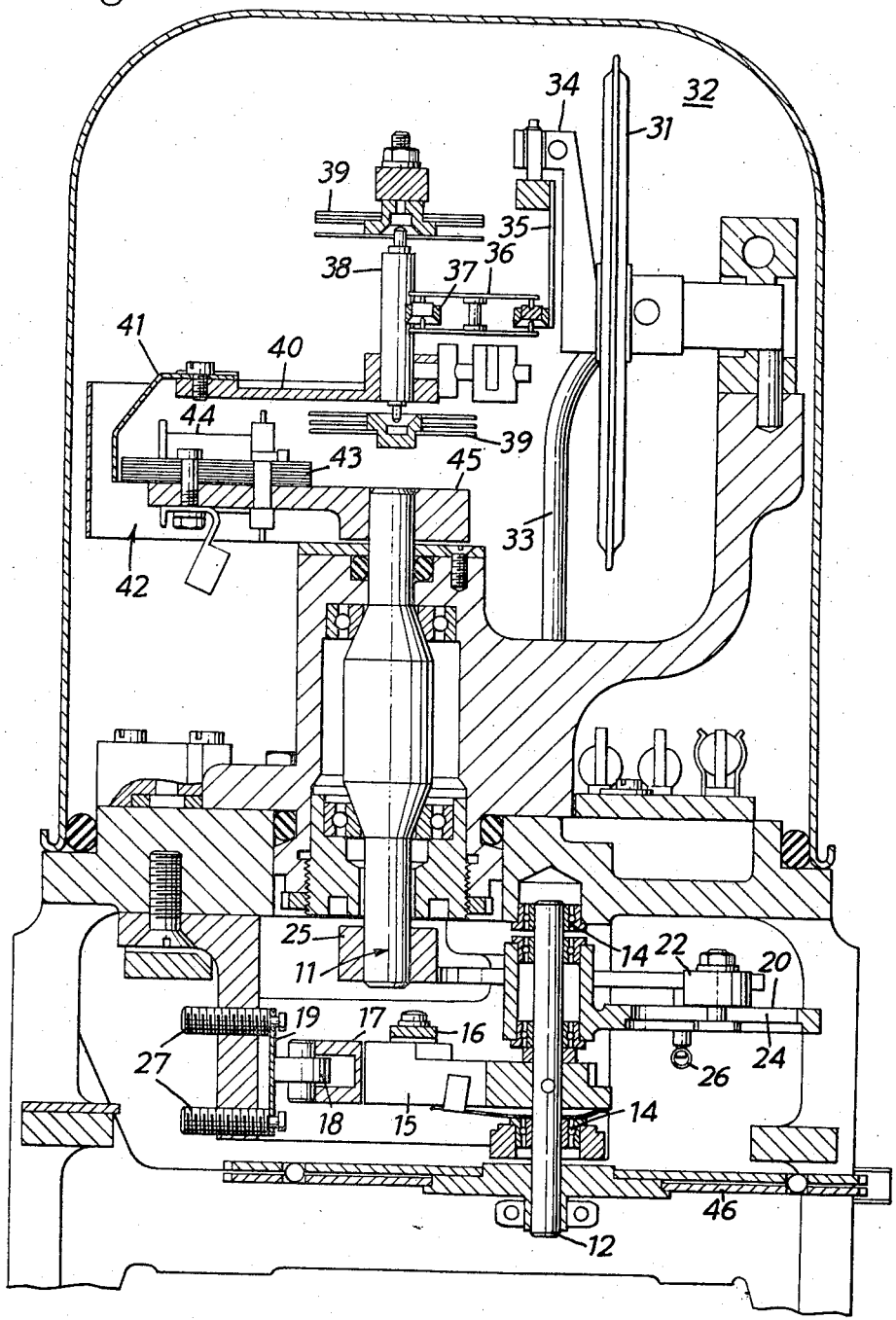
FIGURE 4 is a side sectional view of a pitot static capsule for an air data system according to the invention for an aircraft including a calibration apparatus similar to that shown in FIGURES 1 to 3.
Figure 5:
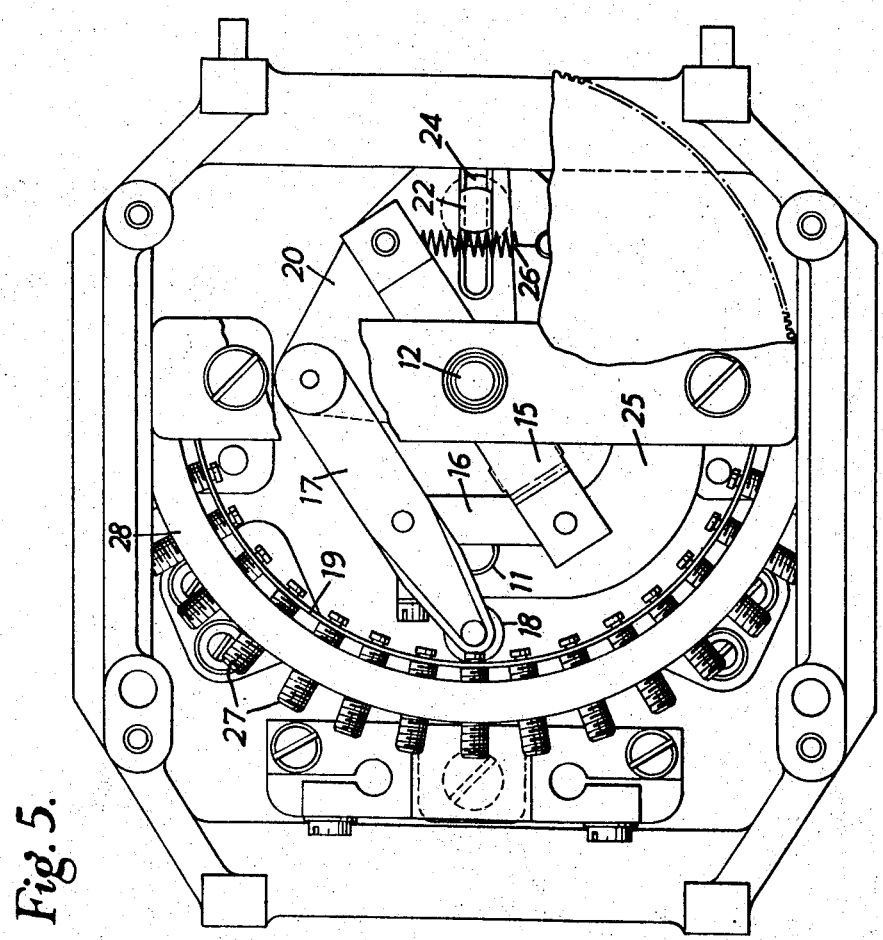
FIGURE 5 is a plan view, part cut away, of the bottom of the capsule of FIGURE 4.

Referring now to FIGURES 4 and 5 there is shown a pitot static capsule 31 which is mounted in a pressure tight chamber 32 and is supplied with a pitot static pressure from a pitot static sensing head (not shown) via a pipe 33. Variations between the pressure in the chamber 32 and the pressure in the capsule 31 cause contraction and expansion of the capsule 31 so causing movement of a member 34 carried by the capsule 31. The member 34 is connected via a bi-metallic strip 35, which compensates for temperature variation in the chamber 32, and a linkage 36 to a member 37 carried on a shaft 38. Hence movement of the member 34 causes corresponding rotational movement of the shaft 38 which is mounted between sprung jewel bearing arrangements 39. A member 40 is rigidly mounted on the shaft 38 for rotational movement therewith and carries a member 41 of magnetic material which serves as an armature for a transducer 42. The transducer 42 includes laminations 43 and a coil 44. The transducer 42 is carried on a member 45 which in turn is carried by the output shaft 11 and is rigidly mounted thereon so as to rotate therewith.

In operation of the whole arrangement movement of the pitot static pressure capsule 31 causes a movement of the armature 41 which in turn causes an error signal to be produced in the coil 44 of transducer 42. The error signal is fed to a servo motor (not shown) which is caused to rotate and through a gear train (not shown) causes a gear wheel 46 to rotate, the gear wheel 46 being rigidly mounted on the input shaft 12 for rotation therewith. Hence rotational movement of the gear wheel 46 causes rotational movement of the input shaft 12. A proportionate rotational movement of the output shaft 11 is caused as described with reference to FIGURES 1 to 3. Rotational movement of the shaft 11 causes the transducer 42 to be positioned relative to the armature 41 such that no error signal is produced in the coil 44 and the servo motor controlled thereby is stopped.

The arrangement connecting the input shaft 12 and the output shaft 11 is utilised to provide calibration of the whole arrangement. The roller 22 is positioned on the arm of the bell crank lever 20 so as to adjust the gearing between the input shaft 12 and the output shaft 11. The camming surface 19 is adjusted so as to take account of variations in the law of the pitot static capsule 31. The gear wheel 46 is connected via further gear trains to further servo arrangements (non shown) to provide a display of the variations in pitot static pressure e.g. in the form of an altitude reading and/or to provide outputs for utilisation in the automatic control of an aircraft.

The arrangements shown provide an extremely accurate calibration apparatus which can be accommodated in a relatively small space. A single spring 26 is utilised to provide all the tensioning required for the calibration apparatus and is arranged such that backlash in the apparatus is virtually eliminated.

What is claimed is:

1. Apparatus capable of producing a predetermined rotational output, through a part of a revolution, of an output shaft in response to a predetermined rotational input, through a part of a revolution, of an input shaft, the apparatus comprising an output shaft; an input shaft parallel with and displaced from the output shaft, a first member rigidly mounted on the input shaft; a second member pivotally mounted on the first member at a point remote from the input shaft axis; a third member pivotally mounted on the second member at a point remote from the pivotal axis of the second member and between the ends of the third member; a camming surface with which one end of the third member cooperates; a lever mounted for rotation about the axis of the input shaft and pivotally connected to the other end of the third member; a fourth member rigidly mounted on the output shaft and in direct abutting engagement with said lever at a point remote from the axes of the input and output shafts; and means engaging said at least one of said four members and the lever and resiliently biassing the four members and the lever to predetermined operative positions; whereby rotation of the input shaft causes rotation of the output shaft in a proportion depending on the shape of the camming surface.

2. Apparatus as claimed in claim 1 wherein the camming surface is substantially an arc of a circle concentric with the input shaft.

3. Apparatus as claimed in claim 1 wherein the camming surface is a surface of a deformable strip of material, means being provided to deform the strip at discrete areas to achieve a desired camming profile.

4. Apparatus as claimed in claim 3 wherein the means for deforming the strip comprises screw members co-operating therewith at discrete places along its length.

5. Apparatus as claimed in claim 1 wherein the point of co-operation of the lever with the fourth member is adjustable to vary the relation between the distance from said point to the input shaft axis and the distance from said point to the output shaft axis.

6. Apparatus as claimed in claim 1 wherein the means for resiliently biassing the four members and the lever comprises a spring co-operating with the first and fourth members to exert counter-acting moments on said first and fourth members with respect to the input shaft axis, thereby maintaining the third member in contact with the camming surface and the lever in contact with the fourth member.

7. Apparatus as claimed in claim 6 wherein the spring is a tension spring acting to draw together the fourth member and a part of the first member on the side of the input shaft axis remote from the second member.

8. Apparatus as claimed in claim 1 wherein the output shaft axis lies on the opposite side of the input shaft from the point of cooperation of the lever with the fourth member, the output shaft axis and said point of cooperation being substantially equidistant from the input shaft.

9. In an air data system a servo arrangement comprising a pitot static pressure capsule, differential means coupled to said pressure capsule for giving an output error signal on movement of the capsule output, driving means coupled to said differential means and operated in response to said error signal and compensating means coupled to said differential means for driving the differential means to reduce the error signal to zero, the compensating means including an apparatus capable of producing a predetermined rotational output, through a part of a revolution, of an output shaft in response to a predetermined rotational input, through a part of a revolution, of an input shaft, the apparatus comprising an output shaft coupled to the differential means to drive the differential means; an input shaft parallel with and displaced from the output shaft and coupled to the driving means and driven thereby, a first member rigidly mounted on the input shaft; a second member pivotally mounted on the first member at a point remote from the input shaft axis; a third member pivotally mounted on the second member at a point remote from the pivotal axis of the second member and between the ends of the third member; a camming surface with which one end of the third member cooperates; a lever mounted for rotation about the axis of the input shaft and pivotally connected to the other end of the third member; a fourth member rigidly mounted on the output shaft and in direct abutting engagement with said lever at a point remote from the axes of the input and output shafts; and means engaging said at least one of said four members and the lever and resiliently biassing the four members and the lever to predetermined operative positions; whereby rotation of the input shaft causes rotation of the output shaft in a proportion depending on the shape of the camming surface.

References Cited
UNITED STATES PATENTS

| 2,585,852 | 3/1952 | Overacker | 74—63 |
| 2,826,082 | 3/1958 | Ranson | 74—63 |
| 2,899,831 | 8/1959 | Haverland | 74—63 |

HALL C. COE, *Primary Examiner.*

U.S. Cl. X.R.

74—568